UNITED STATES PATENT OFFICE.

RALPH H. McKEE, OF RIDGEFIELD PARK, NEW JERSEY.

PRODUCTION OF ALUMINA.

1,290,269.  Specification of Letters Patent.  Patented Jan. 7, 1919.

No Drawing.  Application filed June 9, 1917. Serial No. 173,775.

*To all whom it may concern:*

Be it known that I, RALPH H. McKEE, a citizen of the United States, residing at Ridgefield Park, in the county of Bergen and State of New Jersey, have invented certain new and useful Improvements in the Production of Alumina, of which the following is a specification.

The object of this invention is to provide an economical process of obtaining practically pure alumina from such impure raw materials as the known deposits of basic aluminum sulfate, the acid-soluble furnace residues remaining after the extraction of potassium from feldspars, sericite, or other potassium-bearing silicates of aluminum, and in general from acid-soluble aluminous materials or residues. My process is electrolytic, and in its preferred embodiment is cyclical in character, the acid solvent being to a large extent regenerated in the course of the operation.

The process will be described by way of example in its application to the recovery of practically pure alumina from native deposits of basic aluminum sulfate carrying considerable silica, together with small proportions of iron and usually magnesia. A representative deposit of this kind was found to contain about 16% of $Al_2O_3$, 14% $SO_3$, 3% $FeO_3$, and 1% $MgO$, the balance chiefly silica. From a material of this kind aluminum sulfate approximately equivalent to the $SO_3$ present can be extracted with water, but this extraction represents only about one third of the total alumina.

My process may be carried out as follows:—

(1) The raw material is ground and treated with dilute sulfuric acid, in proportion roughly equivalent to the soluble bases present. This sulfuric acid is in large part regenerated in a later operation.

(2) The material is next subjected to a fractional electrolytic purification having for its object the elimination of most or all of the iron, this treatment depending upon the observation that iron hydroxid is more readily precipitated by electrolysis than is aluminum hydroxid. This purifying step may take several forms, including the following:—

(a) The ground ore is suspended in the solution, for example in an iron pot or trough connected as cathode and provided with one or more insoluble anodes, preferably of lead or carbon. The suspension may be maintained by stirring, for example by the injection of compressed air during the passage of the electric current. The effect of this treatment is to precipitate iron hydroxid while increasing by an equivalent amount the quantity of aluminum in solution. There is no marked tendency to the precipitation of aluminum hydroxid so long as a material quantity of iron remains in the solution.

(b) The purification may also be carried out in an electrolytic cell of the diaphragm type, having a perforated cathode in contact with an asbestos or other diaphragm, and an insoluble anode. In this case iron is precipitated as hydroxid as before, the rate of flow of the liquid and the voltage of the cell being easily controlled to avoid the precipitation of aluminum hydroxid in material proportions.

The introduction of air during the electrolysis serves also to oxidize any ferrous compounds, particularly such as may be formed in the region of the cathode, whereby the separation of the iron as ferric hydroxid is accelerated and rendered more complete.

(3) In whatever way the purifying step may be carried out, the purified solution is filtered off and permitted to flow through a diaphragm cell, preferably of the type described above, the current conditions being chosen to effect as complete a precipitation of aluminum hydroxid as is practicable, having due regard to the current efficiency. The electrolyte may be introduced into the cathode compartment of the cell, and maintained therein at a sufficient hydrostatic head above the level in the anode compartment to afford a flow through the diaphragm approximately equivalent to the rate of precipitation of the aluminum hydroxid, and to the passage of sulfuric acid into the anode compartment, this difference of hydrostatic head being controlled for example by the provision of an overflow pipe in the anode compartment.

Considerable latitude in the choice of current conditions is permissible. I have obtained satisfactory results using a cathode current density of about one ampere per square decimeter; an anode current density of 0.3 amperes per square decimeter or less; and a potential difference of about 6 volts. The temperature may vary from 20° to 50°

C., the precipitation being somewhat better at the lower temperature ranges.

The cathode solution carries the precipitated aluminum hydroxid which is filtered off, dried, and moderately heated, and is then ready for shipment. The filtrate may be worked up by any appropriate method to recover aluminum remaining in solution therein. The anode solution contains the free sulfuric acid resulting from the electrolytic decomposition of the salt, and is applied directly to a fresh batch of the basic ore for the preparation of additional quantities of solution, as already described in connection with the initial step of the process.

My invention may be carried into effect with known types of electrolytic cell, including diaphragm cells of the older type used for the production of caustic soda from brine. It is found desirable to maintain the solutions both during the electrolytic purification and the electrolytic precipitation of the alumina at temperatures materially above normal, since thereby the respective precipitates are more readily separated by filtration.

In treating basic sulfates of aluminum by the above described method, the acid solvent preferably used is of course sulfuric acid, but it will be understood that hydrochloric acid may be used when other aluminous materials are treated, such for example as the acid-soluble residues from the known processes in which potash feldspars or the like are furnaced with alkaline or alkaline-earth chlorids.

I claim:—

1. A process of recovering substantially pure alumina from acid-soluble aluminous materials containing iron, including native basic sulfates of aluminum, which consists in dissolving the aluminous material in an acid solvent, fractionally removing iron by electrolysis, and then electrically precipitating the aluminum as hydroxid.

2. A cyclical process of recovering substantially pure alumina from acid-soluble materials containing iron, including native basic sulfates of aluminum, which consists in dissolving the aluminous material in an acid solvent, fractionally removing iron by electrolysis, then electrically precipitating the aluminum as hydroxid with simultaneous regeneration of the acid solvent, and re-using the acid solvent in the initial step of the process.

In testimony whereof I affix my signature in presence of two witnesses.

RALPH H. McKEE.

Witnesses:
   HELEN MILLER NOYES,
   F. E. ALDEN.